United States Patent [19]

Pike

[11] 3,841,061

[45] Oct. 15, 1974

[54] GAS CLEANING APPARATUS
[75] Inventor: Daniel E. Pike, Harrington Park, N.J.
[73] Assignee: Air Pollution Industries, Incorporated, Eaglewood, N.J.
[22] Filed: Nov. 24, 1972
[21] Appl. No.: 309,093

[52] U.S. Cl............ 55/223, 55/226, 55/240, 261/62, 261/112, 261/115, 261/118, 261/DIG. 54
[51] Int. Cl............................................ B01d 47/10
[58] Field of Search...... 55/223, 226, 240; 261/116, 261/118, 112, DIG. 54, 62, 115

[56] References Cited
UNITED STATES PATENTS

| 2,361,150 | 10/1944 | Petroe............... | 261/DIG. 54 X |
| 3,317,197 | 5/1967 | Lohner et al....... | 261/116 X |
| 3,498,028 | 3/1970 | Trouw................ | 261/116 X |
| 3,556,948 | 1/1971 | Kinzler et al....... | 261/118 X |
| 3,567,194 | 3/1971 | Shah et al.......... | 261/DIG. 54 X |
| 3,638,925 | 2/1972 | Braemer............. | 261/DIG. 54 X |

Primary Examiner—Frank W. Lutter
Assistant Examiner—William Cuchlinski, Jr.
Attorney, Agent, or Firm—Jack Schuman

[57] ABSTRACT

Contaminated gas is passed downwardly through vertical venturi. Trough pipes having portions of the upper wall removed so as to provide troughs facing upwardly against the downcoming stream of contaminated gas are equispaced about the perimeter of the entrance to the venturi throat section, extending inwardly toward the vertical axis of the throat section, and introduce wash liquid such as water into the throat of the venturi. Tangential pipes at converging inlet to venturi throat inject water to form rotating descending film on venturi inner wall advancing toward throat of venturi. Descending water from trough pipes and tangential pipes forms unobstructed channels or conduits in venturi throat section through which the contaminated gas stream passes. Gas stream impinges upon the water bounding the channels or conduits so that contaminants are removed from gas stream by water. Thereafter, descending water completely covers transverse cross section of venturi.

10 Claims, 6 Drawing Figures

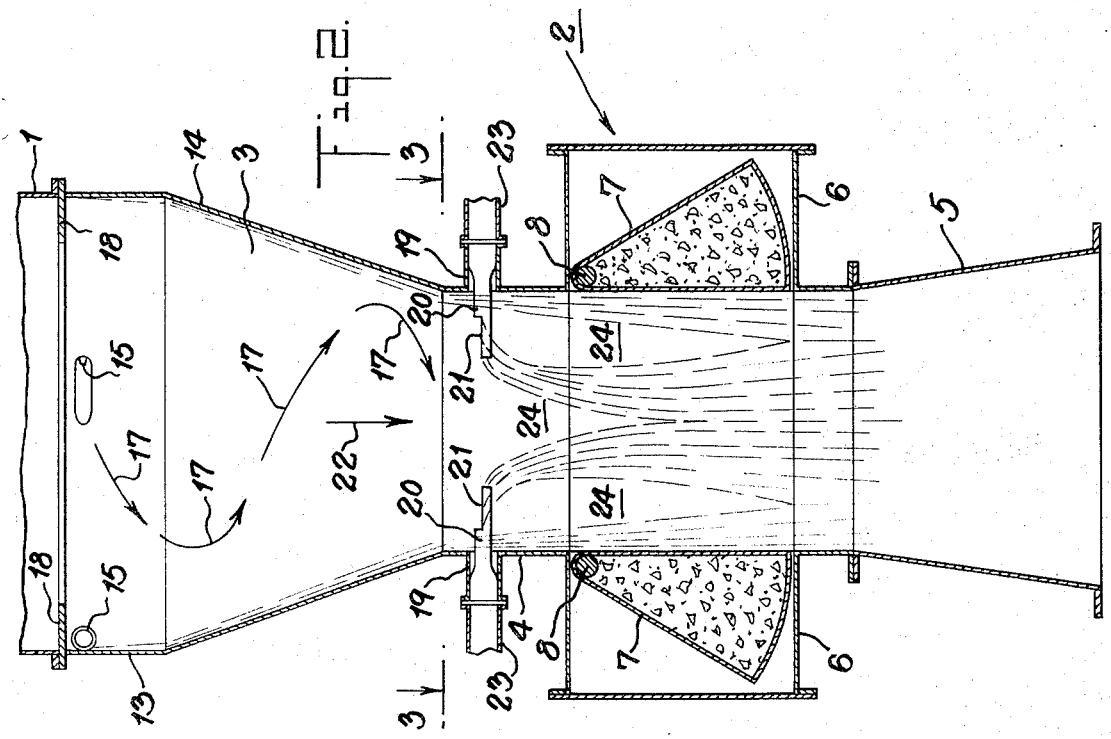
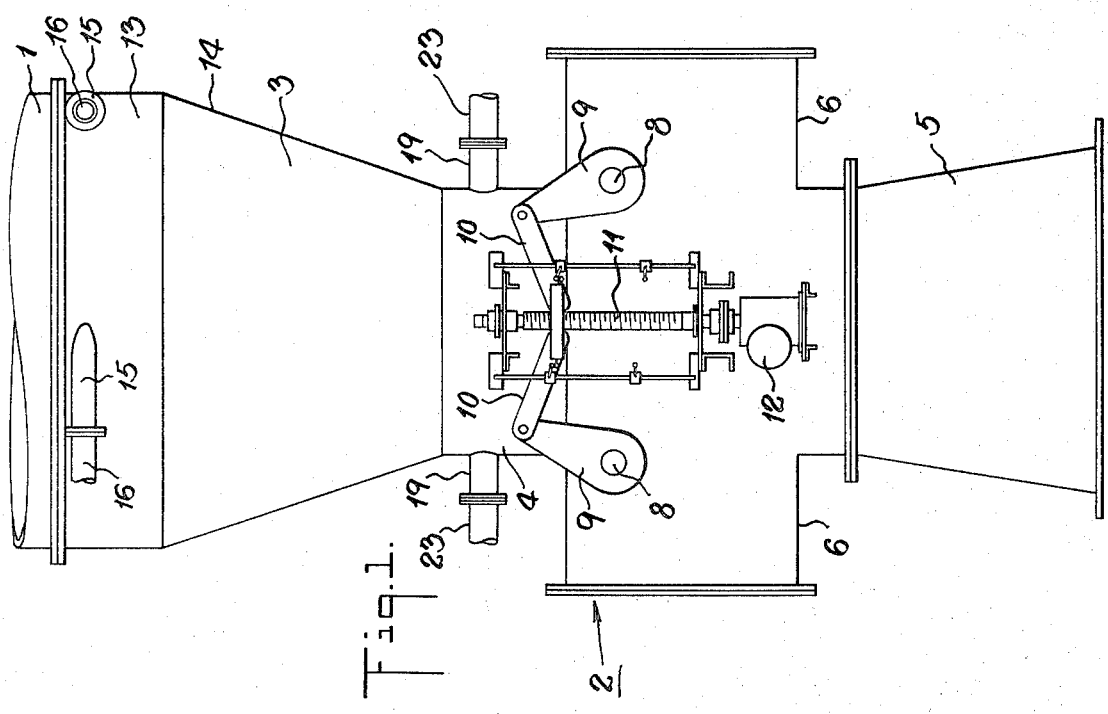

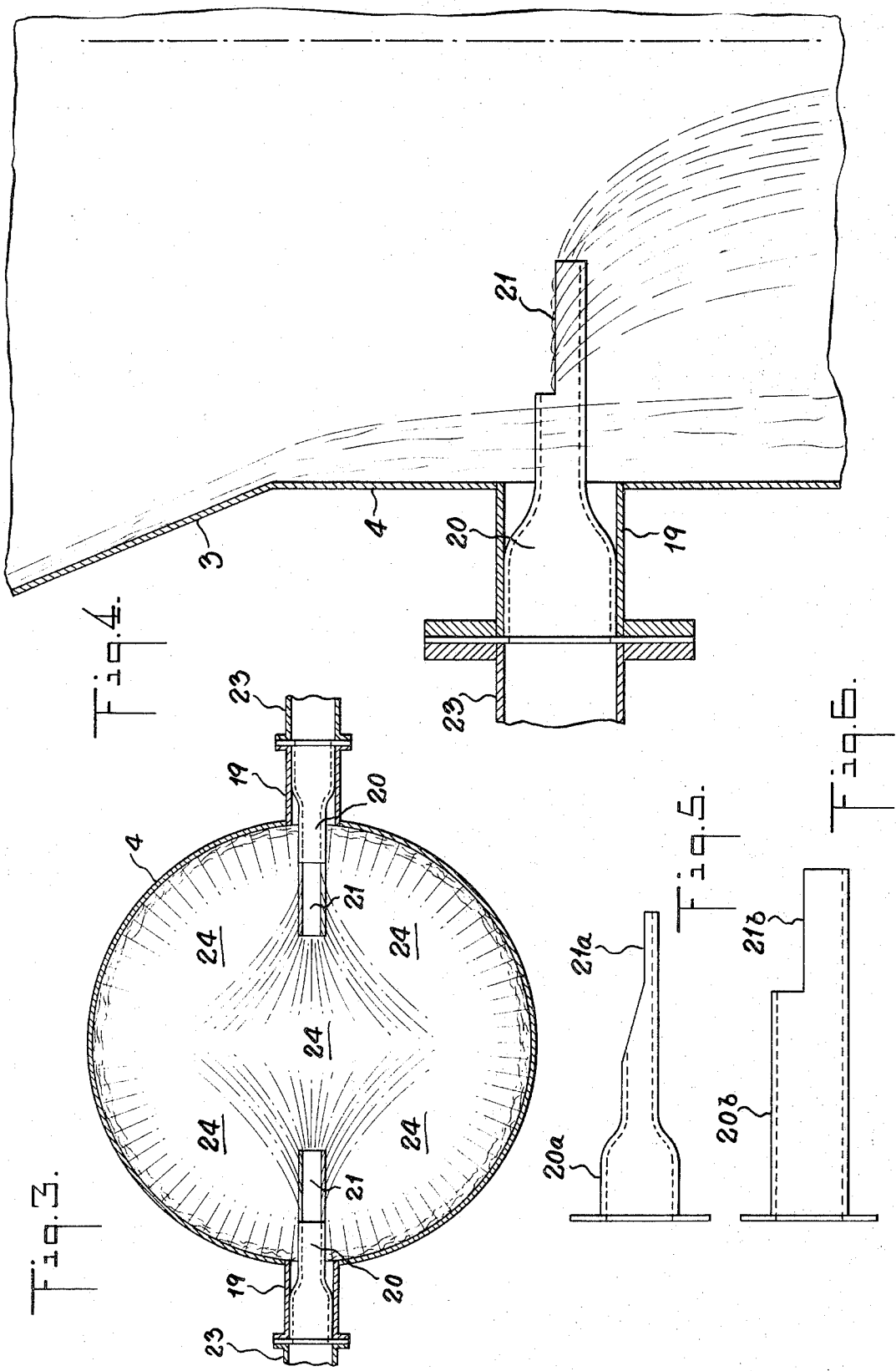

3,841,061

GAS CLEANING APPARATUS

BACKGROUND OF THE INVENTION

1. Field of the Invention

This invention relates broadly to apparatus for cleaning gases. More specifically, this invention relates to apparatus for removing contaminants from a gas stream by means of streams of wash liquid directed into the gas stream in a particular manner.

2. Description of the Prior Art

In many industrial processes, gas streams entrain quantities of contaminants such as solid particles and carry these contaminants from the process. It is desirable, and indeed necessary in some situations, to remove such contaminants from the gas stream, and it is particularly desirable to effect such cleaning operation as completely, economically, and at as high an efficiency, as possible.

Previously, wet washers have been used for separating contaminants from a gas stream, these conventional wet washers being based upon the employment of nozzles to inject or squirt atomized wash liquid such as water into the gas stream to absorb and/or collide with the contaminants, thus removing said contaminants from the gas stream and cleaning the said gas stream.

Also, previously, venturi washers or scrubbers have been employed in which a liquid spray is directed into the gas stream at the beginning of the converging section or at the throat section, perpendicular to the wall of the washer. Such apparatus as conventionally employed has been found not to have an efficiency as high as could be desired. In the design of these conventional scrubbers, an attempt is made to penetrate the gas stream and atomize the wash liquid simultaneously. Because of water injection problems, said conventional scrubbers are limited to long narrow rectangular throats, a limitation which will be found not to apply to the present invention.

The primary problem with prior art structures has been the excessively high pressure drop required to obtain a reasonably satisfactory degree of removal of contaminants from the gas stream. The pressure drop herein mentioned accrues primarily from three sources, broadly speaking, viz. (1) energy taken from the gas stream to break up or atomize the wash liquid, (2) energy taken from the gas stream to overcome frictional resistance due to the flow of the gas stream over the scrubber walls and masses of wash liquid, and (3) energy taken from the gas stream to accelerate the wash liquid to the velocity of the gas stream. The first two sources of pressure drop hereinabove mentioned, viz. atomization and frictional resistance, are responsible only for very small fractions of the total pressure drop, or its equivalent energy requirement. The last source of pressure drop hereinabove mentioned, viz. acceleration of wash liquid, is responsible for the major portion of the total pressure drop, or its equivalent energy requirement.

One attempt at solving the problem is shown in U.S. Pat. No. 3,167,413 (1965) to Kiekens et al. The disclosure of this patent is directed to striking a balance between minimum pressure drop or loss and maximum amount of solid particles removed from a gas stream for large variations in the amount of solid particles in the gas stream and/or for large variations in the velocity of the gas stream. The patent states that large variations in the velocity of the gas stream and large variations in the concentrations of solid particles in the gas stream occur, for example, when a furnace door is opened or when charging a furnace, or when cleaning a furnace, or when a chemical process is being changed, and the gas streams from these foregoing operations are to be cleaned. Accordingly, the patent discloses a vertical conduit with an inlet opening at the top through which the solid particles-contaminated gas stream flows and passes downwardly in the said vertical conduit. Within the conduit, a horizontally disposed tubular frame having two concentric circular rings (when located in a vertical conduit of circular cross-section) or a square outline bounding a cross (when located in a vertical conduit of square cross-section) is provided, the bottom of the frame having downwardly directed spray nozzles. Introduction of wash liquid into the tubular frame produces, through the horizontally spaced, downwardly directed spray nozzles, a continuous freely falling liquid film having the shape of circular or square grids bounding channels. The apparatus is so proportioned that the gas stream, flowing through the channels bounded by the freely falling liquid, causes the liquid to pull inwardly because of the Bernouilli effect, until the liquid film breaks up into droplets and these droplets are accelerated in the gas stream. It will be noted that, due to the downwardly directed sprays of wash liquid, there can be no horizontal projection of the falling film, and thus complete coverage across the vertical conduit can be obtained only by providing such frame and spray nozzles all around the perimeter of the vertical conduit as well as across the cross-section of the vertical conduit, as shown in the patent. Such an arrangement introduces further pressure drop in the gas stream, due to the necessary obstructions in the vertical conduit, and such arrangement may be quite impractical for certain types of operation.

SUMMARY OF THE INVENTION

One of the objects of this invention is to provide improved apparatus for cleaning gases.

Another of the objects of this invention is to provide improved apparatus for removing contaminants from a gas stream by means of streams of water introduced into the gas stream.

A further object of this invention is to provide improved apparatus for economically removing contaminants from a gas stream.

An additional object of this invention is to provide improved apparatus for removing contaminants from a gas stream, the said apparatus being characterized by durability, low maintenance, and lower pressure drop in the gas stream permitting higher efficiency than that obtainable with conventional apparatus.

Yet another object of this invention is to provide improved apparatus permitting additional contact time between the contaminated gas stream and the wash liquid with little or no additional pressure drop.

Still other and further objects of this invention will become apparent during the course of the following description and by reference to the accompanying drawings and to the appended claims.

Briefly, it has been discovered that the foregoing objects may be attained by mounting, through the wall of a vertical venturi carrying the gas stream to be cleaned, trough pipes extending radially inwardly toward the vertical axis of the venturi, the said trough pipes being disposed in equispaced relation about the perimeter of the entrance to the throat of the venturi. Portions of the upper walls of the trough pipes are removed, so that the trough pipes provide troughs facing upwardly against the descending stream of contaminated gas. Streams of substantially unatomized wash liquid, entering the venturi throat over the side walls and ends of the trough pipes, leave open channels in the initial or upper portion of the venturi throat, said open channels being bounded by falling films or curtains of wash liquid, the contaminants in the gas stream being removed therefrom essentially through the process of impingement on the wash liquid film or curtain. Impaction of the gas stream on the wash liquid film or curtain and consequent acceleration of the wash liquid film in the high velocity throat are minimized.

BRIEF DESCRIPTION OF THE DRAWINGS

Referring now to the drawings in which like numerals represent like parts in the several views:

FIG. 1 represents a view in elevation of a blast furnace scrubber employing the present invention, the high temperature lining of the scrubber being omitted for purposes of clarity.

FIG. 2 represents a medial vertical section of the apparatus shown in FIG. 1.

FIG. 3 represents a section taken along the line 3—3 of FIG. 2, showing in plan the generalized contour of the wash liquid issuing from the trough pipes at the entrance to the venturi throat.

FIG. 4 represents an enlarged view in elevation, partially in section, showing details of a trough pipe extending through the wall of the venturi.

FIG. 5 represents an enlarged view in elevation of a modification of the trough pipe.

FIG. 6 represents an enlarged view in elevation of a further modification of the trough pipe.

DESCRIPTION OF THE PREFERRED EMBODIMENTS

The present invention will be described in its context of use for cleaning gas streams from blast furnace operations. It will, however, be clearly understood that the present invention is capable of, and intended for, removing contaminants from gas streams emanating from sources other than blast furnaces.

Conduit 1, containing a flow of contaminated gas from a blast furnace operation, is connected in a fluid tight manner to a vertical venturi 2 comprising inlet section 3 converging to a throat section 4, the latter connected to a diverging outlet section 5. The throat section 4 may be provided with opposed damper housings 6 containing leaf-like dampers 7 rotatably mounted on shafts 8 and actuated, through arms 9 secured to the ends of shafts 8, links 10 and a screw-operated jack mechanism 11, by means of an electrical motor drive 12. The operation of this mechanism will be apparent from an inspection of FIG. 1 and need not be further described herein other than to say that operation of electrical motor drive 12 opens or closes dampers 7 as required. The dampers 7 are provided to permit control of the blast furnace top pressure or pressure drop through venturi 2, permitting full control from totally open to totally closed position. The use of dampers 7 is well known, as shown, for example, in U.S. Pat. No. 3,393,901 (1968) to Krause, and will not be further described herein.

The interiors of conduit 1 and venturi 2, and those surfaces of dampers 7 exposed to the gas stream, may be provided with a suitable lining, as is known in the art, to withstand the high temperature and abrasive nature of the contaminated gas stream. Such lining may, for example, be a high alumina castable ceramic, silicon carbide brick, or combination thereof, or other material appropriate under the circumstances. The lining has not been shown in the drawings for purposes of simplification.

Inlet section 3 of venturi 2 comprises straight portion 13 formed integrally at the wide end or mouth of tapered section 14. A number of equispaced pipes 15 are disposed tangentially to the inner surface of the straight portion 13 of said inlet section 3 (which, in the preferred embodiment, has a transverse cross-section which is circular), the exteriorly disposed ends of said pipes 15 being connected, through conduits 16, to a source of wash liquid, e.g. water under pressure, whereby said wash liquid is discharged, through the interiorly disposed ends of said pipes 15, tangentially into straight portion 13 to produce a rotating descending film of wash liquid which wets the inner surface of venturi 2. The rotating descending path of such wash liquid is partially and diagrammatically indicated by arrowed lines 17. Advantageously, the upper end of straight portion 13 of inlet section 3 is provided with an inwardly projecting lip or flange 18 extending completely around the inner periphery of said straight portion 13, whereby to prevent wash liquid from moving upwardly into conduit 1.

The transverse cross-section of throat section 4 advantageously is circular, as shown in FIG. 1. It will of course be understood that the present invention is capable of embodiment in venturis having other than circular cross-sections, e.g. square or otherwise symmetrical. In the preferred embodiment of the present invention, two diametrically oppositely disposed flanged nozzles 19 are mounted to throat section 4. A flanged trough pipe 20 is mounted within each flanged nozzle 19, the inner portion of said trough pipe 20 having a reduced cross-section, as shown, and extends into the interior of throat section 4. A portion of the upper wall of that length of the trough pipe 20 within the interior of throat section 4 is removed, thereby to provide a trough 21 facing upwardly against the downcoming stream of contaminated gas indicated generally and diagrammatically by arrowed line 22. In particular, trough pipe 20, and hence trough 21 provided thereby, is open-ended. Flanged conduits 23, communicating with a source of wash liquid, e.g. water under pressure, are bolted to the flanges of trough pipes 20 and flanged nozzles 19. Wash liquid may thereby be introduced into trough pipes 20, flowing into troughs 21 therein, and will exit troughs 21 over the side walls and the ends thereof in a manner hereinafter to be described.

Trough 21 in that embodiment of trough pipe 20 shown in FIGS. 2 and 4 has side walls which are of constant height over the length thereof.

Other shapes of trough may be employed to obtain desired water overflow patterns.

Thus, in FIG. 5, trough 21a of trough pipe 20a has side walls which are slanted or oblique over one portion of trough pipe 20a and which are of constant height over another portion of trough pipe 20a.

In FIG. 6, trough pipe 20b does not have a reduced diameter inner portion, unlike trough pipe 20, but the side walls of trough 21b are of constant height similar to the side walls of trough 21.

In operation, the very hot solids-contaminated gas stream from the blast furnace passes downwardly, as indicated by arrowed line 22, through conduit 1 into vertical venturi 2 in which latter the gas stream is accelerated in accordance with well-known principles of fluid mechanics. As hereinbefore mentioned, wash liquid, e.g. water, is introduced into tangential pipes 15 and forms a film or curtain which descends along the interior of venturi 2 with a rotary vector as indicated diagrammatically by arrowed lines 17. Also, as hereinbefore mentioned, wash liquid, e.g. water, is introduced into trough pipes 20. Troughs 21 facing upwardly, the wash liquid therein is exposed to the oncoming gas stream which carries some wash liquid over the side walls of the said troughs 21 as a film or curtain, the remainder of the wash lqiuid exiting troughs 21 from the open ends thereof as films or curtains.

In the area of trough pipes 20, and for some distance therebelow, the wash liquid from tangential pipes 15 and from trough pipes 20 does not cover the entire cross-section of throat 4. Rather, openings 24 remain between these films or curtains of wash liquid for a substantial portion of the length of throat 4. These openings 24 constitute inlets to channels or conduits bounded by wash liquid which is descending in throat 4. It is through these channels or conduits that the solids-contaminated gas stream passes for a major or at least a substantial portion of the length of throat 4. It is a particular feature of the present invention that films or curtains of wash liquid defining surfaces upon which solid contaminants can impinge for removal are provided, and the trough pipes 20 create such films or curtains of wash liquid in the central portion of throat 4. The films or curtains of wash liquid descending in throat 4 merge adjacent the lower end of throat 4 thereby entirely covering the transverse cross-section of venturi 2.

More specifically, the gas stream picks up or shears off discrete masses of wash liquid from troughs 21 over the side walls thereof, the said discrete masses of wash liquid at least in part collectively constituting the films or curtains defining surfaces for the removal by impingement of solid contaminants from the gas stream as hereinbefore mentioned. These discrete masses of wash liquid initially are not atomized, and indeed atomized particles of wash liquid cannot provide films or curtains with the said surfaces as hereinabove mentioned. Atomization of the discrete masses of wash liquid occurs subsequently in the lower portion of venturi 2, below the bottoms of the wash liquid-bounded channels or conduits, the turbulence of the gas stream carrying the discrete masses of wash liquid into the main body of the gas stream where they are subsequently atomized.

The unobstructed openings 24 formed by the geometry of the wash liquid curtains or films in throat 4 and leading to the wash liquid-bounded channels or conduits permit the solids-contaminated gas stream to dwell in contact with the surface of the wash liquid films or curtains in their mutual descent, solids in the gas stream in the said mutual descent impinging upon, rather than impacting or colliding with, the wash liquid and are removed from the gas stream thereby.

Further, the mutual descent of the gas stream and the surfaces of the wash liquid films or curtains provides a prolonged period of contact therebetween which improves the efficiency of solids removal from the gas stream without any substantial increase in pressure drop. In other words, the additional contact time between gas stream and wash liquid for removal of contaminants from the gas stream is obtained with virtually no increase in pressure drop through the apparatus.

Although two through pipes 20 have been shown in the drawings, it will be understood that the invention is not to be limited to the use of only the two said trough pipes 20. Rather, other numbers of trough pipes 20 may be employed. It will be apparent that the number and disposition of trough pipes 20 may be chosen to provide the desired number and disposition of openings 24 leading to wash liquid-bounded channels or conduits.

In the process of being cleaned, the very hot gas stream is simultaneously quenched.

The present invention permits the attainment of higher cleaning efficiency with lower pressure drop than with conventional apparatus.

I claim:

1. Apparatus for removing contaminants from a flowing stream of gas, said apparatus comprising:
   a. vertical conduit means having upper inlet end means for receiving a downwardly flowing stream of gas from which contaminants are to be removed and lower outlet end means discharging said stream of gas,
   b. trough pipe means extending through the wall of said conduit means between the inlet end means and the outlet end means thereof and directed toward the longitudinal axis of said conduit means,
   c. part of said trough pipe means within said conduit means being formed as an open-ended trough laterally bounded by side walls, the open end of said trough being directed toward the longitudinal axis of said conduit means, the trough facing upwardly toward the inlet end means of said conduit means,
   d. wash liquid conduit means connected to said trough pipe means delivering wash liquid to said trough pipe means,
   e. whereby said trough pipe means delivers wash liquid into the interior of said conduit means, said wash liquid in part flowing from the open end of said trough pipe means into said conduit means, the stream of gas picking up discrete masses of wash liquid over the side walls of said trough and carrying said discrete masses of wash liquid into said conduit means, said wash liquid from said trough pipe means forming descending curtains of wash liquid extending across less than all of the transverse cross-section of said conduit means in the region of said trough pipe means, the balance of said transverse cross-section providing unobstructed openings leading to vertical channels at least partially bounded by said descending curtains of wash liquid,
   f. whereby said gas stream descends through the said vertical channels and contaminants in said gas stream impinge upon the surfaces of the descending curtains of wash liquid bounding said vertical channels and are thereby removed from the gas stream.

2. Apparatus as in claim 1, wherein:
g. said trough pipe means comprises a plurality of trough pipes equispaced about the perimeter of said conduit means.

3. Apparatus as in claim 2, wherein:
h. said trough pipes are horizontally disposed,
i. the tops of the side walls which laterally bound said troughs are horizontal.

4. Apparatus as in claim 2, wherein:
h. said trough pipes are horizontally disposed,
i. the tops of the side walls which laterally bound said troughs are inclined to the horizontal.

5. Apparatus as in claim 2, wherein:
h. said trough pipes are horizontally disposed,
i. the tops of the side walls which laterally bound said troughs are stepped so as to lie partially in one horizontal plane and partially in another horizontal plane.

6. Apparatus as in claim 2, wherein:
h. said trough pipes have a reduced cross-section within said conduit means.

7. Apparatus as in claim 1, wherein:
g. said vertical conduit means is the throat of a venturi, said apparatus further comprising:
h. a conduit section having an upper end and a lower end, the lower end of said conduit section being secured in fluid-tight relationship to the upper inlet end means of said conduit means, the upper end of said conduit section having a larger cross-section than the lower end thereof and receiving said stream of gas,
i. pipe means adjacent the upper end of said conduit section and introducing a plurality of streams of wash liquid tangentially into said conduit section.

8. Apparatus as in claim 7, further comprising:
j. a lip mounted to the upper end of said conduit section above said pipe means extending inwardly and completely around the inner periphery of said conduit section.

9. Apparatus as in claim 8, wherein:
k. said trough pipe means comprises a plurality of trough pipes equispaced about the perimeter of said conduit means.

10. Apparatus as in claim 8, wherein:
k. said trough pipe means comprises two trough pipes diametrically oppositely mounted through the wall of said conduit means in the same horizontal plane.

* * * * *